(12) United States Patent
Penz et al.

(10) Patent No.: US 9,091,305 B2
(45) Date of Patent: Jul. 28, 2015

(54) CLUTCH ASSEMBLY WITH OIL GUIDE

(71) Applicant: MAGNA Powertrain AG & Co KG, Lannach (AT)

(72) Inventors: Andreas Penz, Köflach (AT); Wolfgang Schweiger, St. Stefan (AT); Werner Schöfmann, Graz (AT)

(73) Assignee: MAGNA Powertrain AG, Lannach (AT)

( * ) Notice: Subject to any disclaimer, the term of this patent is extended or adjusted under 35 U.S.C. 154(b) by 0 days.

(21) Appl. No.: 14/047,438

(22) Filed: Oct. 7, 2013

(65) Prior Publication Data

US 2014/0174877 A1 Jun. 26, 2014

(30) Foreign Application Priority Data

Oct. 5, 2012 (DE) .......................... 10 2012 218 257

(51) Int. Cl.
| | |
|---|---|
| *F16D 13/72* | (2006.01) |
| *F16D 13/52* | (2006.01) |
| *F16D 13/74* | (2006.01) |
| *F16D 13/68* | (2006.01) |
| *F16D 25/0638* | (2006.01) |

(52) U.S. Cl.
CPC .............. *F16D 13/52* (2013.01); *F16D 13/683* (2013.01); *F16D 13/72* (2013.01); *F16D 13/74* (2013.01); *F16D 25/0638* (2013.01); *F16D 2300/06* (2013.01)

(58) Field of Classification Search
USPC ....................................... 192/113.31
See application file for complete search history.

(56) References Cited

U.S. PATENT DOCUMENTS

| | | | |
|---|---|---|---|
| 1,928,301 A * | 9/1933 | Pierson ................... | 192/113.36 |
| 4,971,184 A | 11/1990 | Lederman | |
| 2010/0065395 A1* | 3/2010 | Baer et al. .................... | 192/70.2 |

FOREIGN PATENT DOCUMENTS

| | | |
|---|---|---|
| DE | 102006031786 A1 | 1/2008 |
| DE | 102006034154 A1 | 1/2008 |

* cited by examiner

*Primary Examiner* — Ramya Burgess
*Assistant Examiner* — Mark Manley
(74) *Attorney, Agent, or Firm* — Jordan IP Law, LLC; Todd A. Vaughn

(57) ABSTRACT

A clutch assembly with a rotatable clutch hub which is connected rotationally fixedly to several inner plates which may be brought into friction connection with outer plates of an associated clutch basket and form a plate pack. The clutch hub has at least one bore which allows a throughflow of a fluid from the interior of the clutch to the plates, and an oil conduction device attached to the clutch hub at the at least one bore.

14 Claims, 8 Drawing Sheets

CLUTCH ASSEMBLY WITH OIL GUIDE

CROSS-REFERENCE TO RELATED APPLICATIONS

The present application claims priority 35 U.S.C. §119 to German Patent Publication No. DE 10 2012 218 257.8 (filed on Oct. 5, 2012), which is hereby incorporated by reference in its entirety.

TECHNICAL FIELD

A clutch assembly having a rotatable clutch hub which is connected rotationally fixedly to a plurality of inner plates which may be brought into friction connection with outer plates of an associated clutch basket and form a plate pack. The clutch hub has at least one bore which allows a throughflow of a fluid such as, for example, oil, from the interior of the clutch to the plates.

A method for distributing oil in a clutch using the centrifugal force effect of the rotating shafts, in which the fluid (e.g., the oil) flows in the direction of a plate pack of the clutch via bores in a clutch hub. Thus, even with a minimum total fluid volumetric flow supplied to the hub, a desired distribution of fluid over the individual friction faces may be achieved largely independently of rotation speed. The total fluid volume flow supplied to the clutch hub may be produced by an fluid pump or, in a pumpless version, purely by the pressure difference resulting from the geodetic height of the fluid level in the expansion tank (fluid sump, fluid tank) in comparison with the inlet into the rotating system.

BACKGROUND

In automotive applications, which are subjected to constantly rising demands with regard to cost reduction and efficiency maximisation, the aim is to achieve increasingly reduced pump construction sizes, or to flully omit the use of cooling and lubricating oil pumps in the drive train. Thus, in addition to the drag moments, it is possible to reduce system costs, construction space and weight and to achieve acoustic benefits. The use of the centrifugal force effect of wetted rotating components allows such pumpless constructions. However the effectively usable delivery volume flow here is substantially reduced (e.g., by a factor of 10).

In a friction plate clutch as described in German Patent Publication DE 102006034154 A1, the cooling and lubricating oil is supplied to the clutch pack under the effect of centrifugal force, through radial bores in the clutch hub which are distributed over the periphery. Due to the oil supply which is restricted in the axial direction because of the construction, in particular with a greatly reduced oil volume flow, it is not possible to guarantee an even distribution over the plate pack in the longitudinal direction. This undesirable effect is amplified by the centrifugal force effect which rises with the square of the absolute rotation speed. The friction faces located spatially further away from the supply bores are thus supplied with significantly less oil. The result is restricted usability, i.e., a lower rated power of the clutch as a result of the increased thermal load on the friction faces with reduced supply. A further restriction resulting from inadequate oil supply is the tendency to the occurrence of adhesion slip effects, with the associated acoustic disadvantages.

Initial approaches were aimed at arranging the supply bores offset in the axial direction, which however leads to reduced wetting of the friction faces in the peripheral direction. An additional increase in the number of supply bores does not have a positive effect because of the limited oil volume flow. Also restrictions occur in relation to production and strength, which are reflected in disproportionately high unit costs.

U.S. Pat. No. 4,971,184 discloses a roller overrun clutch with insert parts which are integrated constructionally in the clutch hub. The hub production is adapted and the hub contains radial supply bores which expand conically radially towards the outside. The oil distribution is improved, but a reduced supply to the friction faces further away from the supply bore in the axial direction cannot be prevented with the overall low supply volume flow. In addition, for construction reasons the hub has relatively large areas of weakening.

SUMMARY

Embodiments relate to an optimised oil supply with good oil distribution over the entire region of the plates, without intervention in the structural design of a conventional clutch. Insert parts spatially arranged between the clutch hub and the inner diameter of the plates facilitate an optimum oil distribution in the axial and radial directions independently of rotational speed. The proposed solution in accordance with embodiments may be implemented in almost all conventional plate clutch systems with minimum modification cost.

In accordance with embodiments, a clutch assembly includes at least one of the following: a rotatable clutch hub which is connected rotationally fixedly to a plurality of inner plates which configured for a frictional connection with outer plates of an associated clutch basket and which form a plate pack, the clutch hub having at least one bore which facilitates a throughflow of fluid from the interior of the clutch to the plates; and an oil conduction device connected via the at least one bore of the clutch hub.

In accordance with embodiments, a clutch assembly includes at least one of the following: a plate pack having a plurality of inner plates and a plurality of outer plates; a rotatable clutch hub connected rotationally fixedly to the inner plates and configured for a friction connection to the outer plates, the clutch hub having at least one bore which facilitates a throughflow of a fluid from the interior of the clutch to the plate pack; and a conduction device the fluid connected to the clutch hub at the at least one bore.

In accordance with embodiments, a clutch assembly includes at least one of the following: a clutch basket; a clutch hub operatively connected to the clutch basket, the clutch hub having a shaft portion extending along a longitudinal axis, a first wall portion extending radially from the shaft portion, a shoulder portion extending from the wall portion in an orientation parallel to the shaft portion, a second wall portion extending radially from the shoulder portion, and a plurality of bores provided in the shoulder portion; a plate pack arranged on the second radial wall portion and which surrounds the shoulder portion, the plate pack having a plurality of alternatively arranged first plates and second plates configured for operational engagement with each other by friction fit through an application of an axial force; and a conduction device operatively connected to the clutch hub and configured to cool and lubrication the friction faces of the first plates and the second plates.

In accordance with embodiments, a clutch assembly includes at least one of the following: a clutch basket; a clutch hub operatively connected to the clutch basket, the clutch hub having a shaft portion extending along a longitudinal axis and having inner toothing at an inner surface thereof, a first wall portion extending radially from the shaft portion, a shoulder portion extending from the wall portion in an orientation parallel to the shaft portion, a second wall portion extending radially from the shoulder portion, and a plurality of bores provided in the shoulder portion; a plate pack arranged on the second radial wall portion and which surrounds the shoulder portion, the plate pack having a plurality of alternatively arranged first plates and second plates configured for operational engagement with each other by friction fit through an application of an axial force; and a conduction device operatively connected to the clutch hub and configured to cool and lubrication the friction faces of the first plates and the second plates.

In accordance with embodiments, a method for distributing fluid in a clutch includes at least one of the following: using a centrifugal force of rotating components of the clutch such that flow of the fluid is in the direction of a plate pack of the clutch via bores of a clutch hub, and guiding the flow of the fluid in the direction of the plate pack via a fluid conduction device which divides the oil onto plate pairs of the plate pack.

In accordance with embodiments, a method for distributing oil in a clutch includes at least one of the following: establishing an operative, rotatable connections between a clutch basket, a clutch hub, and a plate pack of the clutch; using the centrifugal force produced by the rotating clutch basket and the clutch hub such that fluid in the clutch flows in the direction of the plate pack via the clutch hub; and then guiding the fluid flow to separate regions of the plate pack.

In accordance with embodiments, it is advantageous that the oil conduction device is connected to a fixing device in the bore of the clutch hub.

In accordance with embodiments, it is furthermore advantageous that the oil conduction device has distribution chambers with different outlet cross-sections and, on an oil inlet side thereof, the oil conduction device has a segment star structurally configured to distribute the total oil volumetric flow supplied to the hub into the individual distribution chambers.

In accordance with embodiments, advantageously the segment star also serves for fixing the oil conduction device. Furthermore, the oil conduction device may be attached to the clutch hub, for example, via a fixing lug.

For optimum distribution of the oil volume flow, the oil conduction device has outlet openings which are each associated with a lubricating chamber (generally this is the axial gap between two internally-toothed plates) of the plate pack.

In accordance with embodiments, it is particularly advantageous here that in the clutch assembly, the oil conduction device is an additional component in a conventional plate clutch.

Arbitrary distributions along the clutch pack may be set in accordance with embodiments. In addition, there is the possibility of supplying cooling and lubricating fluid(s) to further components, e.g., bearings or thrust washers.

The solution in accordance with embodiments has the advantage that maximum power yields are achieved for a given oil volume flow due to an even thermal load on the friction faces. Further advantages result from minimising the total oil volume flow necessary, reducing the number of friction faces due to a higher rated specific friction power input, reducing the outer diameter of the clutch due to a higher rated specific friction power input, and an extended service life of friction coatings and oil due to the avoidance of hotspots.

The solution in accordance with embodiments facilitates a reduction in pump construction size or the complete omission of the oil pump. Thus, with simultaneously high power capacity of the clutch, construction space, weight and costs may be saved. In pumpless designs, additional advantages apply such as the reduction in operating noise from the omission of delivery flow and pressure pulsation, and the omission of aeration and cavitation phenomena which are provoked by limitation of delivery flow dependent on rotation speed, due to suction choking.

DRAWINGS

Embodiments will be illustrated by way of example in the drawings and explained in the description below.

DESCRIPTION

Figure 1A:
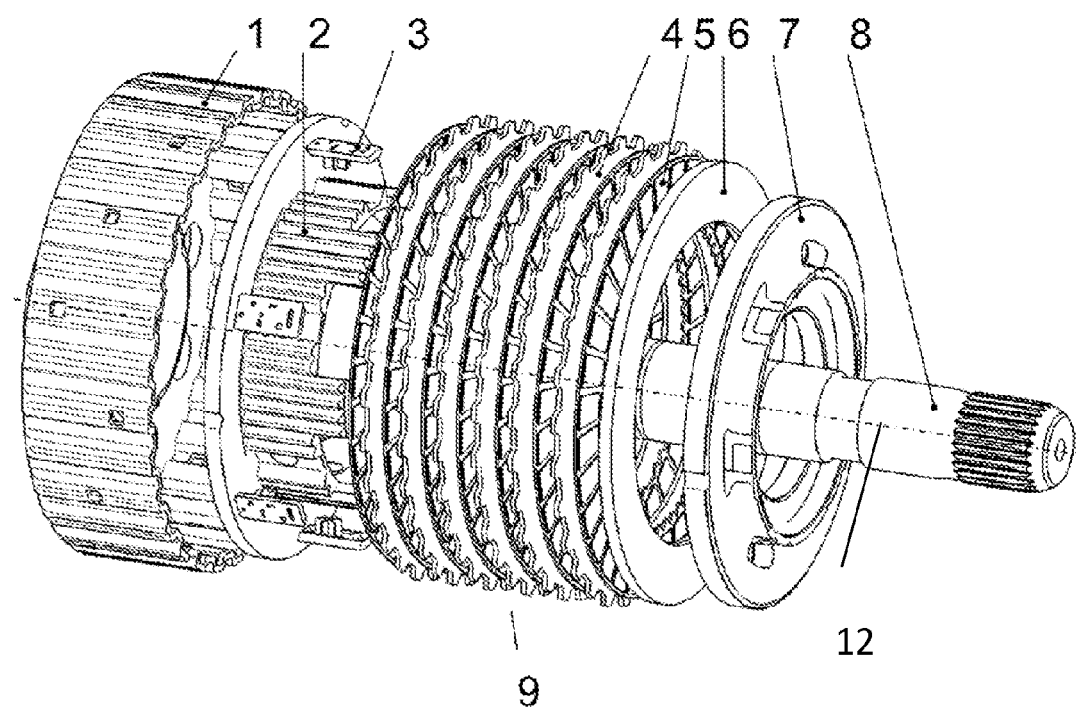
FIG. 1A illustrates a clutch in accordance with embodiments.
Figure 1B:
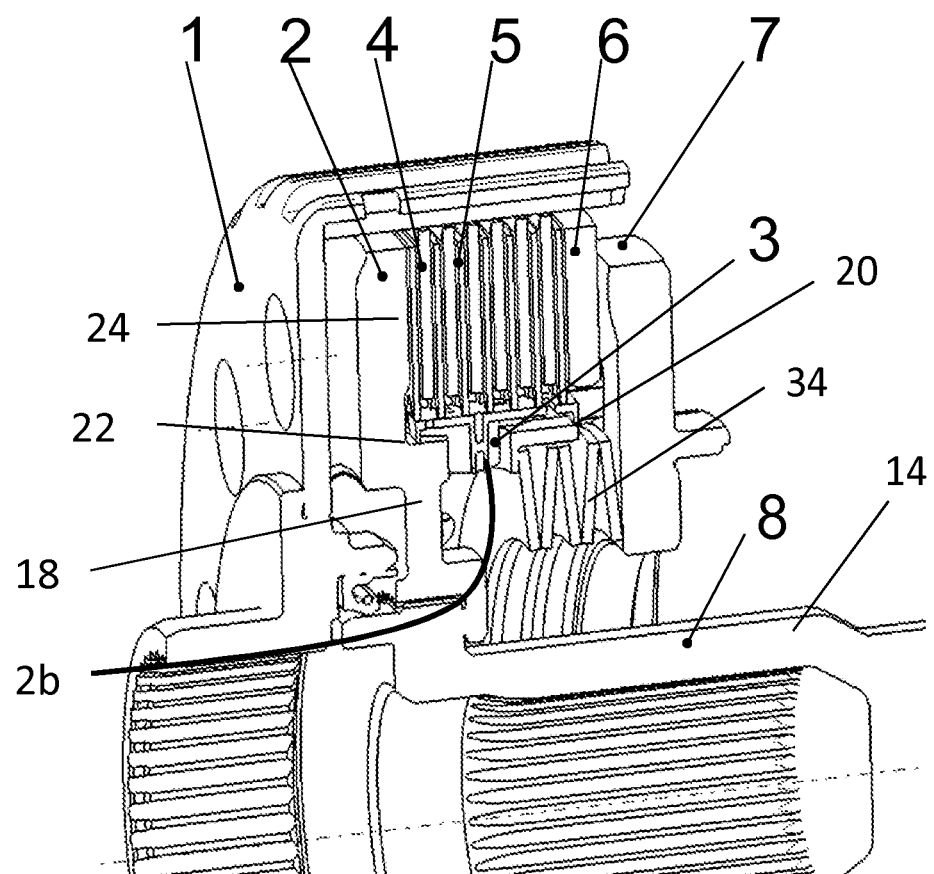
FIG. 1B illustrates a detailed view of a clutch in accordance with embodiments.

As illustrated in FIGS. 1A and 1B, a wet plate clutch includes a rotatably mounted clutch hub 2 which is formed rotationally symmetrical in relation to a longitudinal centre axis 12. The longitudinal centre axis 12 corresponds to the rotational axis of the clutch hub 2 and is used below as a reference axis for the terms "axial" and "radial."

The clutch hub 2 has a shaft portion 14 formed as a hollow cylinder, on the inside of which inner toothing 16 is provided. The shaft portion 14 serves to receive a shaft 8, such as, for example, a gearbox input shaft, which on its outer surface has outer toothing which correspond to and may be brought into operational engagement with the inner toothing 16 of the shaft portion to create an anti-twist connection of the clutch hub 2 and the shaft 8.

On its front end viewed in the axial direction, the shaft portion 14 transforms into a first wall portion 18 extending in the radial direction. The outer end of the radial wall portion 18, viewed in the radial direction, is followed by a hollow-cylindrical shoulder portion 20 which is oriented parallel to the shaft portion 14 and, viewed in longitudinal section, forms a T together with the radial wall portion 18. On its front end viewed in the axial direction, the shoulder portion 20 transforms into a second wall portion 22 extending radially outward. A plurality of bores 2b are provided in the shoulder portion 20.

On the back side 24 of the second radial wall portion 22, a plate pack 9 is arranged which surrounds the shoulder portion 20. The plate pack 9 has a plurality of plates 4 and friction plates 5 which are arranged alternately viewed in the axial direction and mounted movably in the axial direction in relation to the clutch hub 20. The plates 4 may be composed, for example, of steel.

The plates 4 are connected rotationally fixedly to a clutch basket 1 which is also mounted rotatably and is coupled with a second shaft, for example, via a sprocket shaft of a distribution gear. The friction plates 5 are connected rotationally fixedly to the shoulder portion 20 of the clutch hub 2 by way of inner toothing which correspond to and engages in an outer toothing of the shoulder portion 20.

In the coupled state, the plates 4 and friction plates 5 are brought into operational engagement with each other by friction fit, by application of a force acting in the axial direction, to the left in FIGS. 1 and 2, whereby a torque may be transmitted between the second shaft and the first shaft (or vice versa) via the clutch basket 1, the plates 4, 5 and the clutch hub 2. The friction-fit transmission of torque between the clutch basket 1 and the clutch hub 2 takes place by application of an axial force onto the plate pack 9 via a clutch piston 7 and pressure plate 6. The force for bringing the plates 4, 5 into operational engagement may be generated, for example, by an electric or hydraulic actuator, in which an axial disengagement of the plates 4, 5 is provoked or supported by a plate spring assembly 34.

To guarantee the function, adequate cooling and lubrication of the friction faces between the friction plates 5 and plates 4 must be ensured under all operating conditions. Therefore, fluid conduction devices 3 for a fluid such as, for example, oil, are fitted on the shoulder 20 of the clutch hub 2. The fluid conduction devices 3 are fitted above the bores 2b.

Figure 1C:
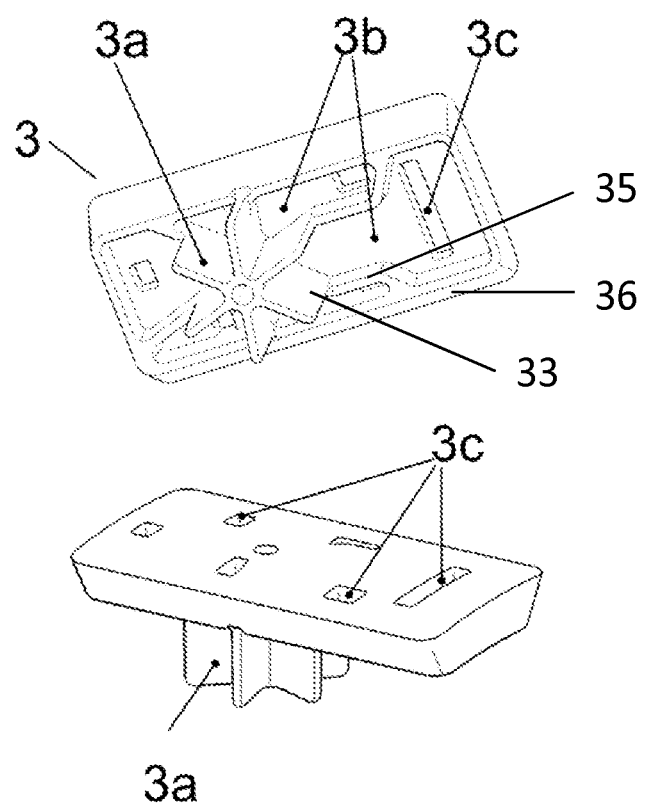
FIG. 1C illustrates an insert part in accordance with embodiment.

As illustrated in FIG. 1C, a fluid conduction device 3 in accordance with embodiments is provided as the insert part.

Figure 3:
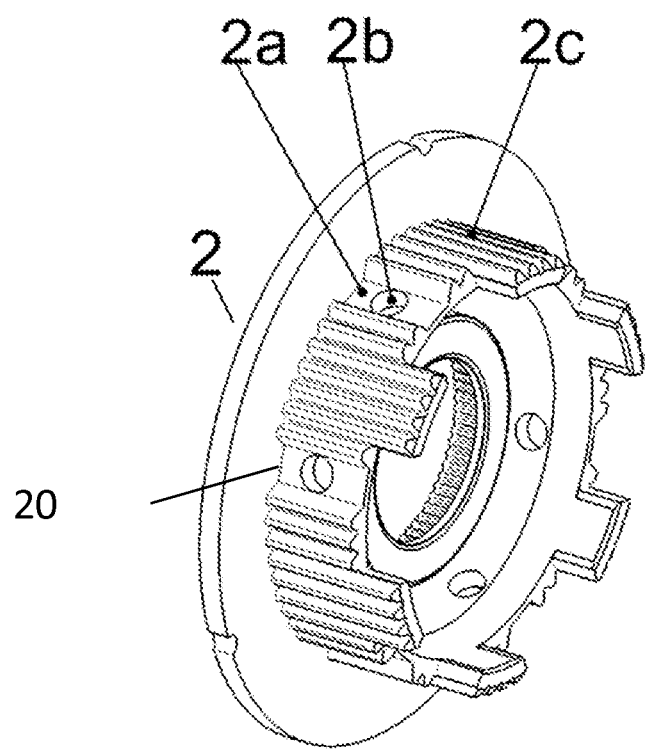
FIG. 3 illustrates a clutch hub in accordance with embodiments.

As illustrated in FIG. 3, the clutch hub 2 has a plurality of receiver grooves 2a on the shoulder 20 in which no plug-in toothing 2c is formed. The thickness of the hub material in this region of the shoulder 20, however, is not weakened. The bores 2b are distributed evenly over the periphery of the hub and fluidically connect the hub interior to the outer periphery of the clutch hub 2.

In this example, the fluid conduction device 3 is formed as a component having, for example, an approximately rectangular-cross section. In the upper part of FIG. 1C, the fluid conduction device 3 is illustrated from below, i.e., in the direction of the shoulder 20 and the bore 2b. The lower part of FIG. 1c illustrates the view onto the surface of the radially outer part.

On one side the fluid conduction device 3 has a segment star 3a which is formed, for example, symmetrically about a centre point as a six-walled star. The wings 33 of the segment star 3a have a first height. Each wing 33 transforms partly into walls 35 or the edge 36. The walls 35 and the edge have a second height which is significantly lower than the first height of the wings 33 of the segment star 3a. The walls 35 and the edge 36 form fluid distribution chambers 3b. The fluid distribution chambers 3b each contain an associated fluid outlet opening 3c.

The fluid conduction devices 3 are inserted in the receiver grooves 2a provided in the clutch hub 2. The segment star 3a thus protrudes into the bore 2b until the edge 36 rests (i.e., in direct physical contact) on the shoulder 20 of the clutch hub 2.

By suitable dimensioning, the segment star 3a is clamped and the fluid conduction device 3 requires no further fixing. Under a centrifugal force effect, the fluid (e.g., oil) flows via the supply bores 2b, arranged radially in the clutch hub 2, and is divided in the segment star 3a into partial volumetric flows which are supplied to the friction faces of the plate pack 9 via definedly arranged outlet openings 3c in the respective distribution chambers 3b. Thus, a desired distribution of the oil volume flow to the individual friction faces may be achieved independently of rotation speed. Primarily the area ratios in the segment star 3a serve as design parameter for establishing the distribution, and for fine adjustment also the opening cross-sections of the outlet openings 3c.

Figure 2A:
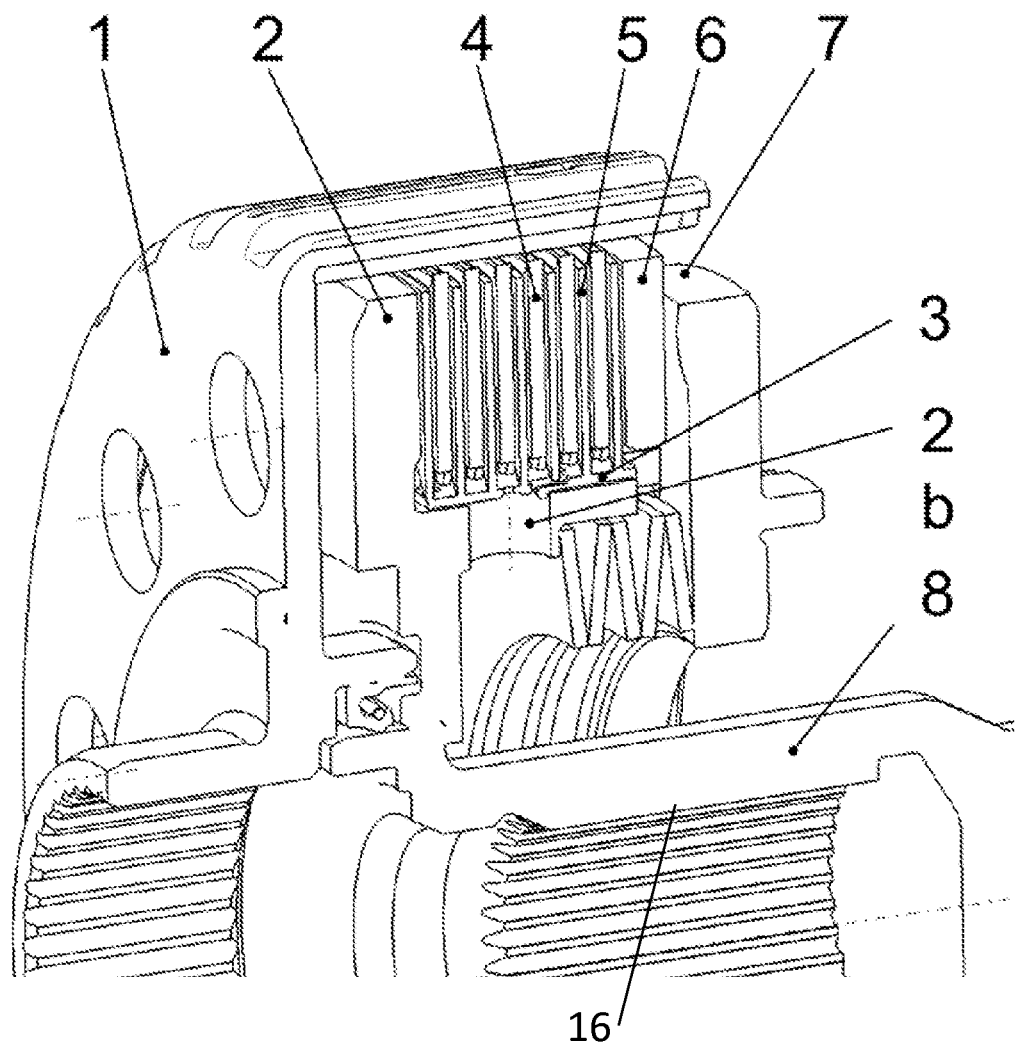
FIG. 2A illustrates a clutch in accordance with embodiments
Figure 2B:
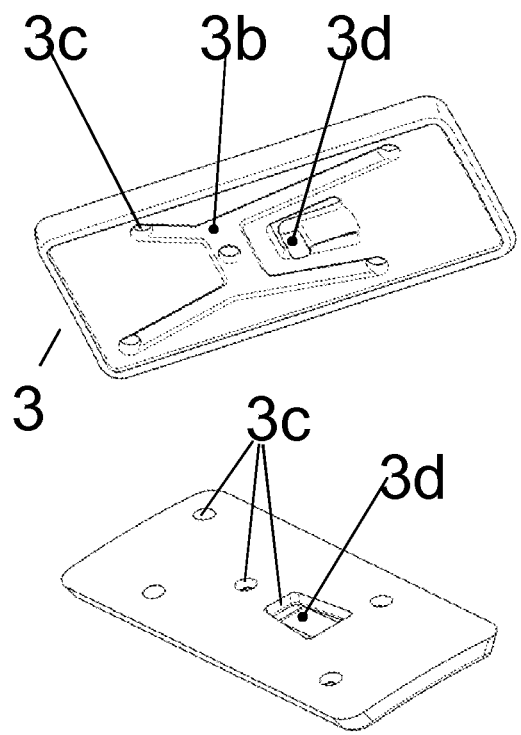
FIG. 2B illustrates an insert part in accordance with embodiments

As illustrated in FIG. 2A, the fluid conduction device 3 in accordance with embodiments provided as an insert part in FIG. 2B, the clutch hub is again evident in FIG. 3. The fluid conduction devices 3 are inserted in the receiver grooves 2a of the clutch hub 2 and axially fixed in the supply bores 2b with fixing lugs 3d. Under a centrifugal force effect, the fluid flows via the supply bores 2b, arranged radially in the clutch hub 2, and is divided by distribution chambers 3b into partial volumetric flows which are supplied to the friction faces via definedly arranged outlet openings 3c. Thus, a desired distribution to the individual friction faces may be achieved independently of rotation speed. The area ratios in the distribution chambers 3b and the opening cross-sections of the outlet openings 3c serve as design parameters for establishing the distribution.

Figure 4:
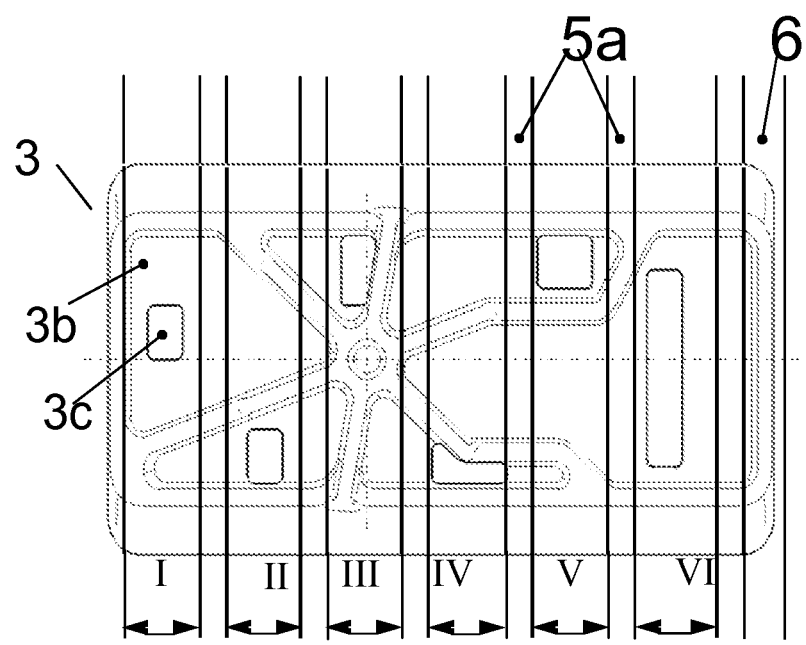
FIG. 4 illustrates an insert part with the chamber regions marked in accordance with embodiments.

As illustrated in FIG. 4, illustrates an association of the plate toothing 5a of the internally-toothed plates with the fluid conduction device 3. The friction faces in the regions marked I-VI are supplied through the outlet openings 3c arranged with fluid distribution chambers 3b fluidically connected with the star-shaped fluid supply channel.

Figure 5A:
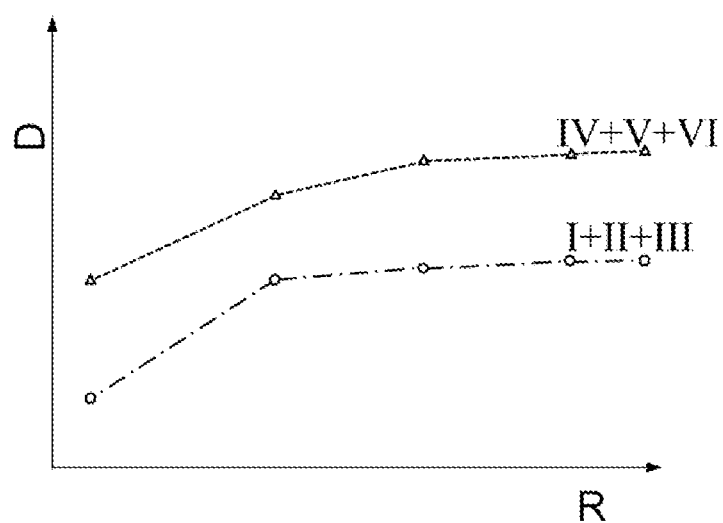
FIGS. 5A and 5B illustrate a qualitative development of the oil distribution in the clutch pack (with insert part) in accordance with embodiments.
Figure 5B:
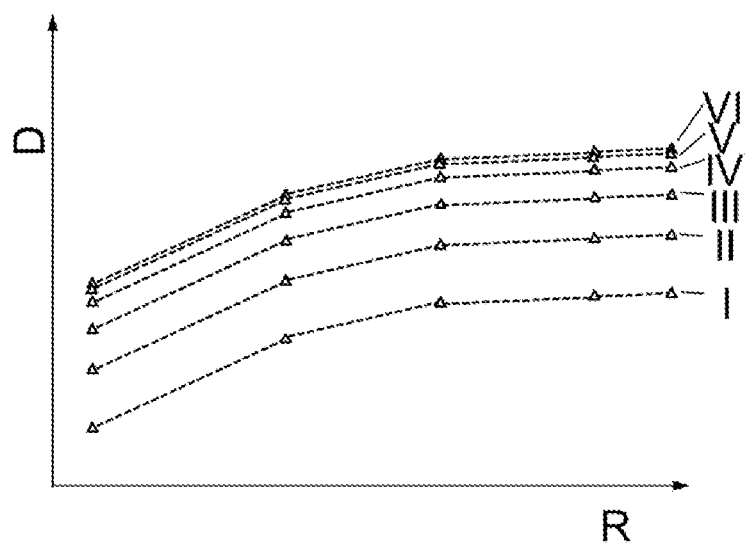

As illustrated in FIGS. 5A and 5B, example qualitative developments of the fluid volumetric flow in regions I-VI, as illustrated in FIG. 4, which were achieved with the fluid conduction device 3 in accordance with embodiments.

The embodiments of the fluid conduction device 3 outlined are given merely as examples, and any embodiment appearing equivalent to the person skilled in the art may also be used.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Clutch basket
2 Clutch hub
2a Receiver groove
2b Supply bore
2c Plug-in toothing
3 Conduction device/Insert part
3a Segment star
3b Distribution chamber
3c Outlet opening
3d Fixing lug
4 Steel plate
5 Friction plate
5a Plate toothing
6 Pressure plate
7 Clutch piston
8 Shaft
9 Plate pack
12 Rotational axis
14 Shaft portion
16 Inner toothing
18 Radial wall portion
20 Shoulder portion 22 Wall portion
24 Back side
33 Wing
34 Plate spring assembly
35 Wall
36 Edge

What is claimed is:

1. A clutch assembly, comprising:
a clutch basket;
a plate pack having a plurality of inner and outer plates connected to each other via a friction connection;
a rotatable clutch hub concentrically arranged relative to and operatively connected to the clutch basket and the inner plates, the clutch hub having a radially extending wall portion from which axially extends a shoulder portion with a plurality of spaced apart grooves having a bore which facilitates a throughflow of a fluid from an interior of the clutch assembly to the plate pack, and outer toothing to be engaged for connection by the inner plates; and
a plurality of fluid conduction devices, each fluid conduction device received by a corresponding groove and respectively has a fluid inlet side with a plurality of distribution chambers, a segment star which protrudes into a corresponding bore to connect the conduction device to the clutch hub and also distribute the fluid supplied to the hub into the distribution chambers, and a fluid outlet side having a plurality of fluid outlet openings fluidically connected to a corresponding one of the distribution chambers,
wherein the segment star includes wings having a first height, each wing partially transforming into walls having a second height less than the first height.

2. The clutch assembly of claim 1, wherein the fluid outlet openings have different cross-sections.

3. The clutch assembly of claim 1, wherein the segment star comprises six walls.

4. The clutch assembly of claim 3, wherein the walls form the fluid distribution chambers.

5. The clutch assembly of claim 1, wherein the walls form the fluid distribution chambers.

6. The clutch assembly of claim 1, wherein the outlet openings are fluidically connected to a lubricating chamber of the plate pack.

7. A clutch assembly, comprising:
a clutch basket;
a clutch hub concentrically arranged relative to and operatively connected to the clutch basket and having a shaft portion extending along a longitudinal axis, a radially extending wall portion from which extends a shoulder portion in an orientation parallel to the shaft portion, the shoulder portion having a plurality of spaced apart grooves having a bore which facilitates a throughflow of a fluid from an interior of the clutch assembly;
a plate pack arranged on the wall portion and which surrounds the shoulder portion, the plate pack having a plurality of alternatively arranged inner and outer plates to be operationally connected by friction fit; and
a plurality of fluid conduction devices, each fluid conduction device received by a corresponding groove and respectively has a fluid inlet side with a plurality of distribution chambers, a segment star which protrudes into a corresponding bore to connect the conduction device to the clutch hub and also distribute the fluid supplied to the hub into the distribution chambers, and a fluid outlet side having a plurality of fluid outlet openings fluidically connected to a corresponding one of the distribution chambers,
wherein the segment star includes wings having a first height, each wing partially transforming into walls having a second height less than the first height.

8. The clutch assembly of claim 7, further comprising a clutch piston and a pressure plate which are to transmit an axial force which facilitates the friction fit connection between the inner plates and the outer plates.

9. The clutch assembly of claim 7, wherein the fluid outlet openings have different cross-sections.

10. The clutch assembly of claim 7, wherein the segment star comprises six walls.

11. The clutch assembly of claim 10, wherein the walls form the fluid distribution chambers.

12. The clutch assembly of claim 7, wherein the walls form the fluid distribution chambers.

13. The clutch assembly of claim 7, wherein the outlet openings are fluidically connected to a lubricating chamber of the plate pack.

14. A method for distributing a fluid in a clutch assembly, the method comprising:
providing a clutch basket, a clutch hub concentrically arranged relative to and operatively connected to the clutch basket and having a shaft portion extending along a longitudinal axis, a radially extending wall portion from which extends a shoulder portion in an orientation parallel to the shaft portion, the shoulder portion having a plurality of spaced apart grooves having a bore which facilitates a throughflow of the fluid from an interior of the clutch assembly to a plate pack arranged on the wall portion and which surrounds the shoulder portion, the plate pack having a plurality of alternatively arranged inner and outer plates to be operationally connected by friction fit; and a plurality of fluid conduction devices, each fluid conduction device received by a corresponding groove and respectively has a fluid inlet side with a plurality of distribution chambers, a segment star which protrudes into a corresponding bore to connect the conduction device to the clutch hub and also distribute the fluid supplied to the hub into the distribution chambers, and a fluid outlet side having a plurality of fluid outlet openings fluidically connected to a corresponding one of the distribution chambers, wherein the segment star includes wings having a first height, each wing partially transforming into walls having a second height less than the first height;
establishing an operative, rotatable connection between the rotating clutch basket, the clutch hub, and the plate pack;
using a centrifugal force of the rotating clutch basket and the clutch hub such that the fluid in the clutch assembly flows in a direction of the plate pack via the clutch hub; and then
guiding the fluid flow to separate regions of the plate pack.

* * * * *